F. H. ALEXANDER.
CLUTCH COUPLING FOR THE TRANSMISSION OF POWER BY SHAFTING.
APPLICATION FILED APR. 5, 1919.
1,322,172.
Patented Nov. 18, 1919.
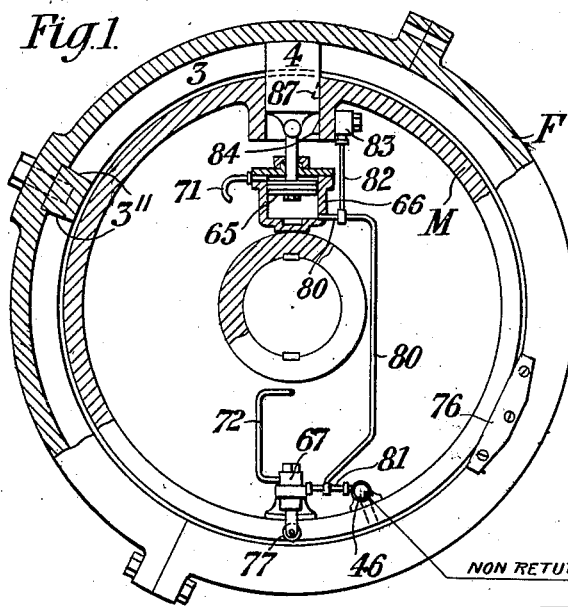
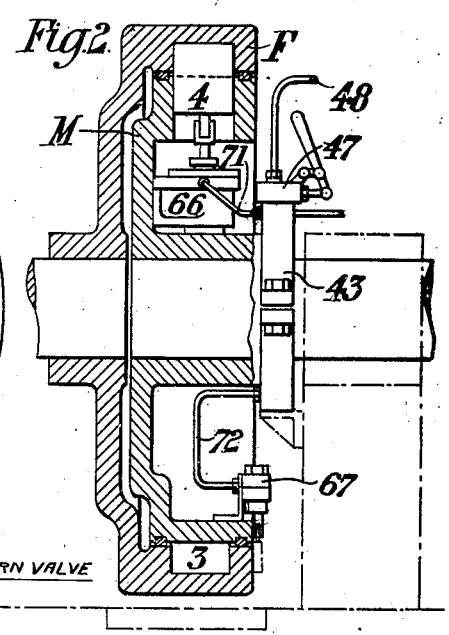
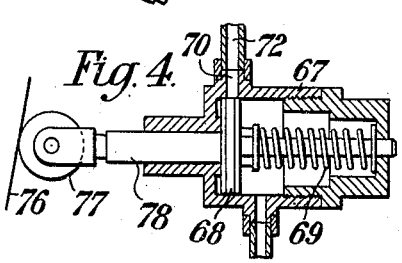
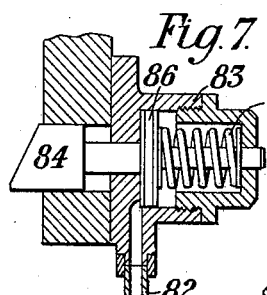
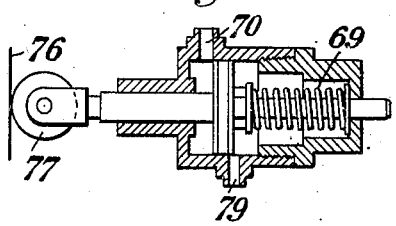
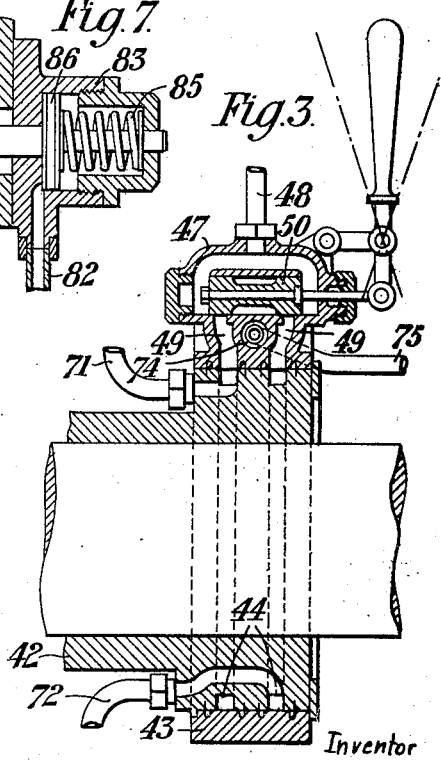
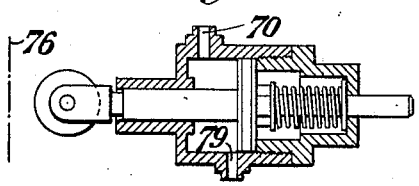
Inventor
Francis Herbert Alexander
by *[signature]*
his Attorney

UNITED STATES PATENT OFFICE.

FRANCIS HERBERT ALEXANDER, OF NEWCASTLE-UPON-TYNE, ENGLAND.

CLUTCH-COUPLING FOR THE TRANSMISSION OF POWER BY SHAFTING.

1,322,172.  Specification of Letters Patent.  Patented Nov. 18, 1919.

Original application filed January 6, 1919, Serial No. 269,866. Divided and this application filed April 5, 1919. Serial No. 287,765.

*To all whom it may concern:*

Be it known that I, FRANCIS HERBERT ALEXANDER, a subject of His Majesty the King of Great Britain, residing at 34 Burdon Terrace, Jesmond, Newcastle-upon-Tyne, England, have invented certain new and useful Improvements in and Relating to Clutch-Couplings for the Transmission of Power by Shafting; and I do hereby declare the following to be a full, clear, and exact description of the invention, such as will enable others skilled in the art to which it appertains to make and use the same.

This invention relates to clutch couplings for the transmission of power by shafting of the kind described in my pending application No. 269866, wherein a radially movable dog carried by one clutch member of the coupling is adapted to be inserted into and withdrawn from a channel provided in the other clutch member, said dog in traveling along this channel during relative rotation of the said members, toward a stop or wall closing the channel, compressing air or other elastic fluid in front of it and thereby alleviating shock or jar on positive contact of the dog and stop. The present application is a division of my said copending application, Serial Number 269,866 filed January 6, 1919.

An object of the present invention is to provide means for operating the dog by fluid pressure, such as compressed air, so as to insure its entry into the channel of the female clutch member at a predetermined point substantially remote from the stop, the supply of pressure fluid to the dog operating means being controlled by a valve which is automatically operated when the clutch members arrive at predetermined relative angular positions. A further object of the invention is to provide a catch adapted to normally hold a radially movable dog locked in the retracted position and means for operating this catch, to release it, by fluid pressure, the supply of fluid pressure to the catch operating means being controlled by a valve automatically operated on the arrival of the clutch members at predetermined relative angular positions. The same automatically operated valve may serve to control the supply of pressure fluid to the operating means of both the dog and the catch. The aforesaid automatically operated valve may also control the supply of compressed air or other elastic pressure fluid to the channel of the female member to be further compressed by the dog.

In the annexed drawings:—

Figure 1 is a part sectional end view and Fig. 2 a part sectional side elevation showing a clutch coupling in accordance with my invention.

Fig. 3 is a longitudinal section through the distributing valve 47 of Fig. 2.

Figs. 4, 5, and 6 are sectional elevations of the automatically operated timing valve, shown in successive positions, and Fig. 7 is a sectional elevation of the locking device.

The channel 3 extends around the inner periphery of the cylindrical female member F and as shown lies throughout in a plane perpendicular to the axis of said member, all parts of the channel being always in line with the dog and there being no axial movement of the clutch members. The channel 3 is of substantially the same width throughout and the entry therein of the dog 4 carried by the male member M at a predetermined point substantially removed from the stop ends 3'' of the channel is automatically effected by compressed air or other pressure fluid at the moment when the clutch members M and F, in relatively rotating, arrive at the correct relative angular positions. The dog 4 is carried on the end of a piston rod whose piston 65 is operated by compressed air and works within a cylinder 66, called the dog cylinder, carried by the male clutch member M. The admission of compressed air to the cylinder 66 to project the dog into the channel 3 is controlled by a valve, called the timing valve, comprising the cylinder 67, carried by the clutch member M, and a piston 68 normally held at the bottom thereof by a spring 69, as seen in Fig. 4, in which position it closes an inlet port 70.

A distributing valve, shown in section in Fig. 3, controls the distribution of compressed air to the timing valve cylinder 67, and also to the top of the dog cylinder 66 above its piston. The extended boss 42 of the member M revolves within the fixed casing 43 and has formed around its periphery the annular grooves 44, whereof one communicates by the pipe 71 with the top of the dog cylinder 66, and the other communicates by the pipe 72 with the inlet port 70 of the timing valve cylinder 67. At the top of the casing 43 is a valve chamber 47 to which compressed air from the source of supply enters by the inlet pipe 48. 49 indicates two ports in the valve chamber 47 corresponding with the annular grooves 44. 74 is an exhaust port and 75 the exhaust pipe. By means of the hand operated slide valve 50 compressed air may be passed to either of the pipes 71, 72, or either of these pipes opened to the exhaust. When the slide valve 50 is in its normal position, as shown, compressed air is cut off from both pipes 71, 72.

A cam or striking plate 76, Fig. 1, on the female clutch member F, is so placed as to be adapted, when the members M and F are in the correct relative angular positions, to contact with the tappet roller 77 on the piston rod 78 of the cylinder 67 and to thereby raise the piston 68 from the bottom of said cylinder. This uncovers the inlet port 70, see Fig. 5, and, the distributing valve 50 having been properly adjusted, compressed air will now enter the cylinder 67 by the pipe 72 and raise the piston still further against the stress of the spring 69 until the outlet port 79 is uncovered, see Fig. 6. From this outlet port a system of distributing pipes 80, 81, 82, leads; pipe 80 to the dog cylinder 66 beneath its piston, pipe 81 to the channel 3 of the female member F, through a non-return valve 46, and pipe 82 to the cylinder 83 of a catch or locking device, whereby the dog 4 is normally held retracted.

The said locking device, see Fig. 7, comprises a catch 84 on the end of a piston rod whose piston 86 works within the cylinder 83, called the locking cylinder, said catch being normally forced outwardly by the spring 85, which bears on the locking cylinder piston, and is adapted to engage with a recess 87 in the dog 4, to hold the latter normally retracted. The compressed air distributed from the timing valve cylinder 67 to the locking cylinder by pipe 82, forces back the piston of the latter against the stress of its spring 85, and so withdraws the catch 84 from the recess 87 of the dog, releasing the latter. When the dog is retracted by adjusting the distributing valve 50 to supply compressed air to the dog cylinder 66 above its piston by pipe 71, at which time the supply pipe 72 of the timing valve cylinder is open to the exhaust, the dog slips over the inclined face of the catch 84, pressing it back against its spring, to jump into locking position again when the dog is fully retracted.

If desired, the dog may be moved in and out of the channel 3 of the female clutch member by hand controlled gear of any suitable construction, instead of by compressed air, the timing means being, however, retained, so as to automatically unlock a dog, normally locked in the retracted position, at the proper moment, and thus permit it to be then inserted into the channel.

To briefly summarize, the operation of the apparatus above described is as follows:—

Assuming the dog to be locked in its retracted position, and the distributing valve 50 to be adjusted in its normal position, as shown in Fig. 3, to prevent the admission of compressed air to either of the pipes 71, 72; the said valve 50 is now adjusted to pass air to the timing valve supply pipe 72, closing this pipe to exhaust and at the same time opening to exhaust the pipe 71 which leads to the top of the dog cylinder 66. No air can, however, enter the timing valve cylinder 67 since its inlet port 70 is closed by its piston. When, however, the clutch members M and F reach the correct relative angular positions, the cam 76 operates the timing valve piston 68 to admit air to its cylinder, and from thence the air is distributed, as above described, to release the dog locking catch 84, project the dog into the channel 3, and, if required, also to enter the channel 3. When the dog is in contact with a stop 3″ at an end of the channel, and the clutch coupling is transmitting the torque of the shafting, the valve 50 is restored to its normal position to prevent the unnecessary passing of compressed air, that remaining in the pipe system and several cylinders gradually leaking away. To retract the dog, the valve 50 is adjusted to cut off compressed air from the timing valve cylinder 67 and to open the supply pipe 72 of the latter to exhaust, and at the same time to admit compressed air by pipe 71 to the dog cylinder 66 above its piston, to withdraw the dog from the channel; and on full retraction of the dog, the spring actuated catch 84 of the locking device will jump into engagement with the recess 87 and hold the dog locked in the retracted position. The valve 50 is now again restored to its normal position, cutting off the compressed air supply from the pipe system, and the compressed air in the dog cylinder gradually leaks away. By this arrangement the consumption of compressed air is economized, none being used either when the clutch coupling is fully disconnected, or when it is fully connected for power transmission.

It is obvious that the construction above described may be considerably modified without in any way departing from my invention. It will also be understood that steam, or other elastic fluid, may be used instead of air.

What I claim and desire to secure by Letters Patent of the United States is:—

1. In a clutch coupling comprising a male clutch member and a female clutch member, the combination of a dog, means for operating the dog by fluid pressure, a valve controlling the supply of pressure fluid to the dog operating means, and means whereby this valve is automatically operated when the clutch members are in predetermined relative angular positions.

2. In a clutch coupling comprising a male clutch member and a female clutch member, the combination of a catch normally engaging with a radially movable dog, means for operating this catch to release it, by fluid pressure, a valve controlling the supply of pressure fluid to the catch operating means, and means whereby this valve is automatically operated when the clutch members arrive at predetermined relative angular positions.

3. In a clutch coupling comprising a male clutch member and a female clutch member, the combination of a dog, means for operating the dog by fluid pressure, a catch normally engaging with the dog, means for operating this catch by fluid pressure to release it, a valve controlling the supply of pressure fluid to the operating means of the dog and of the catch, and means whereby this valve is automatically operated when the clutch members arrive at predetermined relative angular positions.

4. In a clutch coupling comprising a male clutch member and a female clutch member having a channel, the combination of a dog, means for operating the same by fluid pressure, a catch engaging with the dog, means for operating this catch to release it by fluid pressure, a valve, a conduit connecting the valve with a source of fluid pressure, conduits led respectively from said valve to the dog operating means, the lock operating means, and ports opening into the channel of the female clutch member, and means whereby said valve is automatically operated when the male and female clutch members attain predetermined relative angular positions.

In testimony whereof I have hereunto set my hand in the presence of two witnesses.

FRANCIS HERBERT ALEXANDER.

Witnesses:
   Geo. P. Stephenson,
   W. T. Temple.